US005482344A

United States Patent [19]
Walker et al.

[11] Patent Number: 5,482,344
[45] Date of Patent: Jan. 9, 1996

[54] DEPLOYABLE VEHICLE DOOR TRIM PANEL

[75] Inventors: Lee A. Walker, Shelby Township; Srinivasan Sundararajan, Belleville; Geoffrey D. Fletcher, Detroit, all of Mich.

[73] Assignee: Ford Motor Company, Dearborn, Mich.

[21] Appl. No.: 363,056

[22] Filed: Dec. 23, 1994

[51] Int. Cl.$^6$ .................................. B60R 21/04
[52] U.S. Cl. .................. 296/39.1; 296/146.7; 280/751
[58] Field of Search .......................... 296/39.1, 189, 296/146.6, 146.7; 280/751

[56] References Cited

U.S. PATENT DOCUMENTS

| | | | |
|---|---|---|---|
| 3,868,796 | 3/1975 | Bush | 296/146.6 X |
| 3,989,275 | 11/1976 | Finch et al. | |
| 4,272,103 | 6/1981 | Schmid et al. | |
| 4,369,608 | 1/1983 | Miura et al. | 296/146.6 X |
| 4,783,114 | 11/1988 | Welch | |
| 4,786,100 | 11/1988 | Kleemann et al. | |
| 4,969,680 | 11/1990 | Shimoda | |
| 5,040,335 | 8/1991 | Grimes | |
| 5,048,234 | 9/1991 | Lau et al. | 296/189 X |
| 5,102,163 | 4/1992 | Ishikawa | 296/146.7 X |
| 5,306,066 | 4/1994 | Saathoff | 296/189 X |
| 5,395,135 | 3/1995 | Lim et al. | 296/189 X |

FOREIGN PATENT DOCUMENTS

| | | |
|---|---|---|
| 4001947A1 | 1/1990 | Germany . |
| 2-231246 | 9/1990 | Japan . |

Primary Examiner—Joseph D. Pape
Attorney, Agent, or Firm—David B. Kelley; Roger L. May

[57] ABSTRACT

An automotive vehicle occupant compartment is bounded by an energy absorbing vehicle door comprising an outer panel, an inner panel laterally joined to the outer panel, a trim panel releasably attached to an occupant compartment facing side of the inner panel and defining a space between the outer panel and the trim panel with the inner panel therein, and energy absorbing member in the form of bolster blocks mounted in the space so that when an externally originating load is applied generally normal to the door the trim panel deploys into the occupant compartment presenting the energy absorbing member in a substantially undeformed state to the occupant seating area.

20 Claims, 5 Drawing Sheets

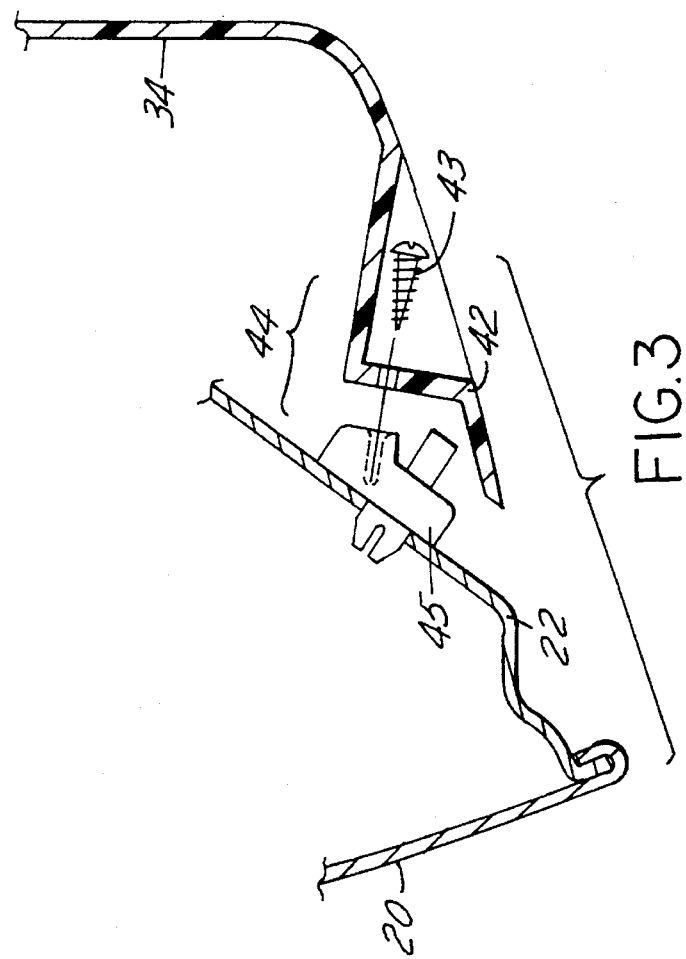

DEPLOYABLE VEHICLE DOOR TRIM PANEL

FIELD OF THE INVENTION

The present invention relates generally to doors and side panels for vehicles and, more particularly, to an energy managing vehicle door having body side panels with a deployable trim panel.

BACKGROUND OF THE INVENTION

Vehicle doors are typically constructed with two or more panels attached to the door frame, including an exterior or outer panel for shielding the passenger compartment from the elements, and an inner door panel which provides structural support. A trim panel is usually fastened to the inner door panel facing the passenger compartment and shields the vehicle occupants from internal door components, such as the window, the window regulator, and the door locks. The trim panel can also provide aesthetic qualities to the interior passenger compartment as well as ergonomic features, for example, easily accessible door handles, mirror and window controls, and the like.

Some vehicle door constructions may also include side bolsters of foam or honeycomb construction to lessen the effects of a side collision. A disadvantage of the side bolster mounted on the occupant compartment side of the trim panel is the reduction of the lateral space available to the occupants. That problem was addressed in U.S. patent application Ser. No. 08/221,282, assigned to the assignee of the present invention and incorporated herein by reference wherein side bolsters are mounted adjacent either the inner panel or the outer panel and protract through the trim panel for deployment into the occupant compartment during a side collision. Manufacture of the trim panel to receive the bolsters, however, requires a more complicated and expensive process than for a trim panel without the bolsters deployed therethrough.

SUMMARY OF THE INVENTION

The present invention provides a new and improved energy absorbing door trim system to enhance side impact performance without decreasing interior package space and without substantially increasing manufacturing expense. The door comprises an outer panel, an inner panel laterally joined to the outer panel, and a trim panel releasably attached to an occupant compartment facing side of the inner panel and defining a space between the outer panel and the trim panel with the inner panel therein. Energy absorbing means are mounted in the space so that when an externally originating load is applied generally normal to the door, the trim panel deploys into the occupant compartment and presents the energy absorbing means in a substantially undeformed state to the occupant seating area. The energy absorbing means can comprise energy absorbant bolsters, such as load-limiting foam, packaged on the interior of the door trim panel, or on both interior of the trim panel and on the interior of the outer panel.

During a side collision type impact, the impacting object intrudes into the door outer panel. This, in turn, causes the bolster to push the trim panel, which, after a predetermined force is applied thereto, releases from a lower portion towards the occupant before being substantially deformed. By deploying the door trim this way, the full effectiveness of the foam bolsters is available to help cushion a vehicle occupant. The deploying door trim panel quickly contacts and begins accelerating the occupant away from the intruding object early in the collision event while limiting the load acting on the occupant, thus producing desirable occupant responses.

One advantage of the present invention is that it does not require extensive trim panel redesign or major modification to production tooling.

Another advantage of the present invention is that it is light weight compared to other known countermeasures.

A still further advantage of the present invention is the preservation of the occupant compartment roominess since it occupies the space between the inner and outer panels and minimizes stowing the bolsters inside the occupant compartment.

A feature of the present invention is a deployable vehicle door trim panel which releases from a lower attachment portion to allow the bolsters to contact an occupant early in a side collision.

BRIEF DESCRIPTION OF THE DRAWINGS

These and other advantages and features of the present invention will be apparent to those skilled in the automotive body arts upon reading the following description with reference to the accompanying drawings, in which:

FIG. 2 is a side elevational view through a vehicle door showing the energy absorbing means and trim assembly according to a first embodiment of the present invention illustrated in operational relationship with an occupant and a vehicle partially shown.

FIG. 3 is a side elevational view of a screw and clip type attachment for mounting a trim panel to an inner door panel according to one embodiment of the present invention.

DETAILED DESCRIPTION OF THE PREFERRED EMBODIMENTS

Figure 1:
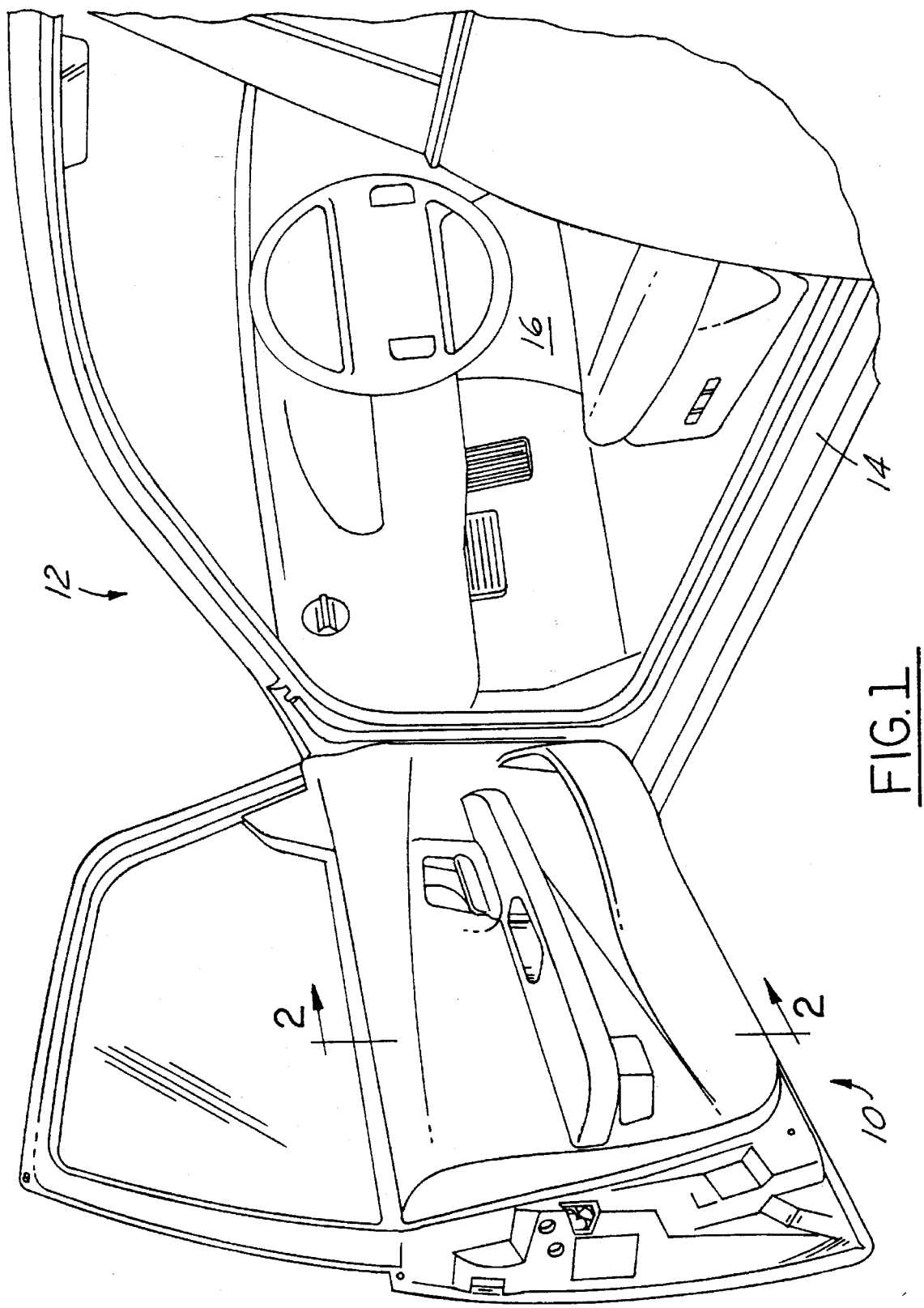
FIG. 1 is a partial perspective view of a vehicle occupant compartment bounded by an energy absorbing vehicle door according to the present invention.

Turning now to the drawings, and in particular to FIG. 1 thereof, an energy absorbing vehicle door 10, according to the present invention, is illustrated in operational relationship with a vehicle, generally indicated at 12, such as an automotive vehicle (partially shown). More specifically, the energy absorbing vehicle door 10 is illustrated in operational relationship with a rocker panel 14 of the vehicle 12 and an occupant seating area, generally indicated at 16. It should be appreciated that the rocker panel 14 is stationary and connected to the structure of the vehicle 12 and that the vehicle door 10 is moveable and connected to the remaining structure of the vehicle 12 as is known in the art.

As best seen in FIG. 2, the energy absorbing vehicle door 10 includes an outer panel 20 and an inner panel, generally indicated at 22, joined together in conventional fashion to form a space 24 therebetween. Door 10 also includes an aperture 26 at an upper end for receiving a window 28, which may move in and out of the space 24. A window regulator device, a door latch, and other components of a vehicle door (not shown) as known in the art may also be housed in space 24.

The energy absorbing vehicle door 10 further includes an intrusion or door guard beam 30 secured longitudinally in the space 24 between the outer and inner panels 20, 22 by suitable means such as hem-flanging and/or welding. Alternatively, intrusion beam 30 can be secured on an exterior surface 32 of outer panel 20 by similar means.

Still referring to FIG. 2, a door trim panel 34 is mounted on the inner panel 22 to form a space 36 therebetween. The door trim panel 34 includes an arm rest 38 generally facing the occupant seating area 16. Preferably, the trim panel 34 is fixedly secured with fasteners 40, such as screws, to the inner panel 22 in the general vicinity of the arm rest 38 so that a lower portion 42 of the trim panel 34 pivots about the arm rest 38 toward the occupant seating area 16 during a side impact type collision of the vehicle door 10, as is further discussed below. Lower portion 42 of the door trim panel 34 is releasably secured to the inner panel 22 by suitable lower fasteners 44 such as a screw 43 and clip 45 arrangement as shown in FIG. 3. The retention force of the the lower fasteners 44 is chosen so that the lower portion 42 of the trim panel 34 releases when pushed with sufficient force, for example by an energy absorbing bolster 46 as described below. Other fastening means may also be used, such as Christmas tree fasteners, push pins, or other fasteners known to those skilled in the art and suggested by this disclosure.

Preferably, the outer panel 20 and inner panel 22 are made of a metal material or other suitable materials. The door trim panel 34 is made of a suitable material such as plastic, cardboard, wood-fiber, or a combination thereof, and may be covered with cloth, vinyl, leather, or carpeting as is known in the art.

Figure 4:
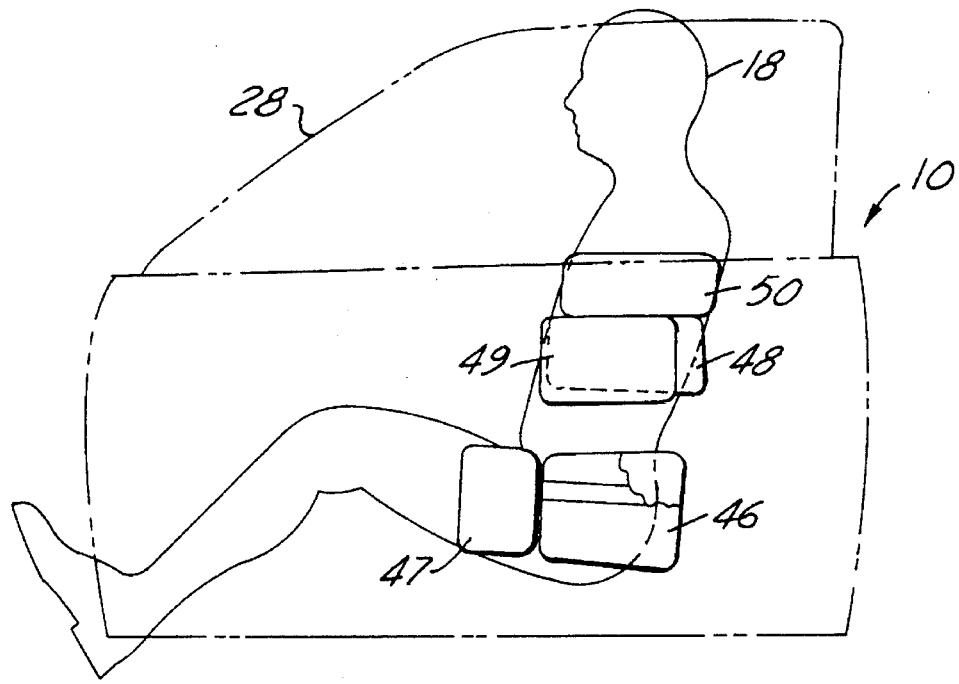
FIG. 4 is a side elevational view of an energy absorbing vehicle door, according to the present invention, illustrated in operational relationship with an occupant.

The energy absorbing vehicle door 10 further includes at least one, and preferably a plurality, of energy absorbing bolsters 46, 47, 48, 49, 50 as seen in FIG. 4. The energy absorbing bolsters 46, 47, 48, 49, 50 are, preferably, foam material blocks made from polyurethane foam, but may also be made of other suitable materials such as expanded beads, aluminum or paper honeycomb. The energy absorbing bolsters 46, 47 are generally rectangular in shape and have a predetermined crush strength large enough to withstand and transmit a side impact load to the trim panel 34 so as to overcome the retaining force of the lower fasteners 44 on lower end 42 to deploy the trim panel 34 into the occupant seating area 16 with the bolsters 46, 47 in a substantially undeformed condition. The energy absorbing bolsters 46, 47 may have different crush strengths, shapes and thicknesses as required for protection of the pelvis and leg regions of the occupant 18. Crush strengths between 20–45 psi are typical for bolsters 46, 47.

The energy absorbing bolsters 48, 49, 50 are, preferably, of different crush strengths, shapes and thicknesses for protection of the chest region of the occupant 18. Crush strengths of 5–20 psi are typical for bolsters 48, 49, 50. It should be noted that the embodiments of the energy absorbing door in FIGS. 2, and 5–9 do not show, or only show some of, the bolsters 47, 48 and 49, but those skilled in the art will realize that door 10 may include those bolsters.

In the first embodiment shown in FIG. 2, an energy absorbing bolster 46 is disposed through an aperture 52 in the inner panel 22 proximate the occupant seating area 16 extending into the space 24 between the outer panel 20 and the inner panel 22, and space 36 between the inner panel 22 and the trim panel 34. The bolster 46 is mounted to the trim panel 34 by suitable means such as an urethane adhesive, for example. An upper energy absorbing bolster 50 is disposed between inner panel 22 and trim panel 34 near an upper end 54 of the trim panel 34. The energy absorbing bolster 50 is mounted to either the inner panel 22 or door trim panel 34 by suitable means such as an adhesive as previously described, or alternatively, may be trapped between the inner panel 22 and door trim panel 34, as shown.

Figure 5:
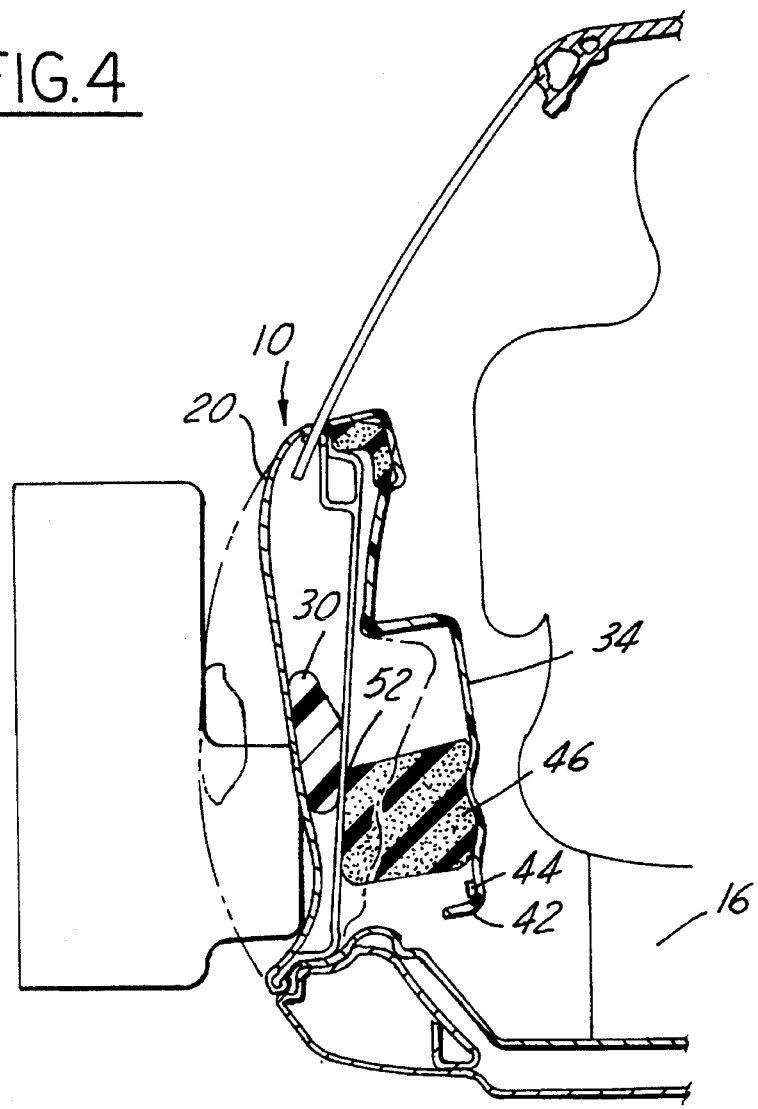
FIG. 5 is a side elevational view similar to FIG. 2 but shown with the energy absorbing means in an undeformed state deployed according to the present invention into the occupant seating area after a side impact type collision.
Figure 6:
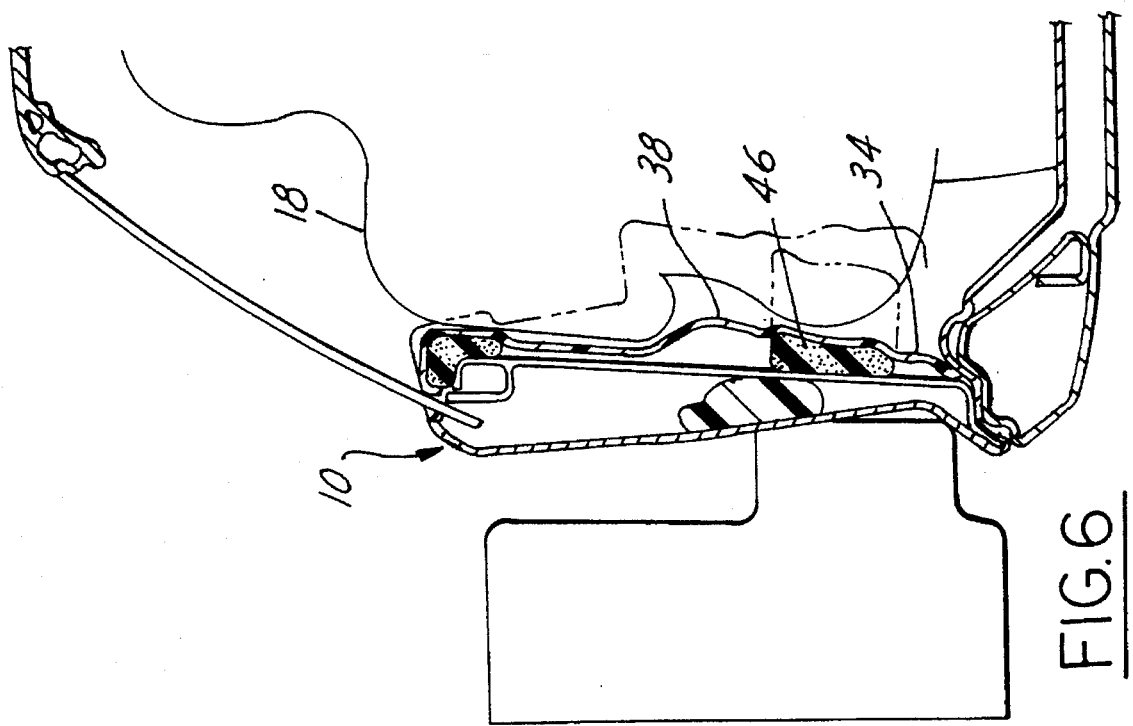
FIG. 6 is a side elevational view similar to FIGS. 2 and 5 but shown the energy absorbing means in a crushed state after contact with an occupant.

In operation, the energy absorbing vehicle door 10 may be subject to a side collision type impact, as depicted in FIG. 5. When this occurs, the displacement of the outer panel 20 and intrusion beam 30 pushes the energy absorbing bolster 46 through the aperture 52 of inner panel 22 with sufficient force so as to overcome the retaining force of the lower fasteners 44 on lower end 42 and thus deploy the trim panel 34 into the occupant seating area 16 with the bolster 46 in a substantially undeformed condition in time for cushioning. As seen in FIG. 6, the occupant 18 contacts the deployed trim panel 34 while moving toward the door 10 and is cushioned by the bolster 46 which is compressed during the event. In addition, it will be noted that arm rest 38 collapsibles upon imposition of a load thereagainst originating generally from the occupant seating area 16, and, in particular, from contact with occupant 16, thus providing further energy absorption.

Figure 7:
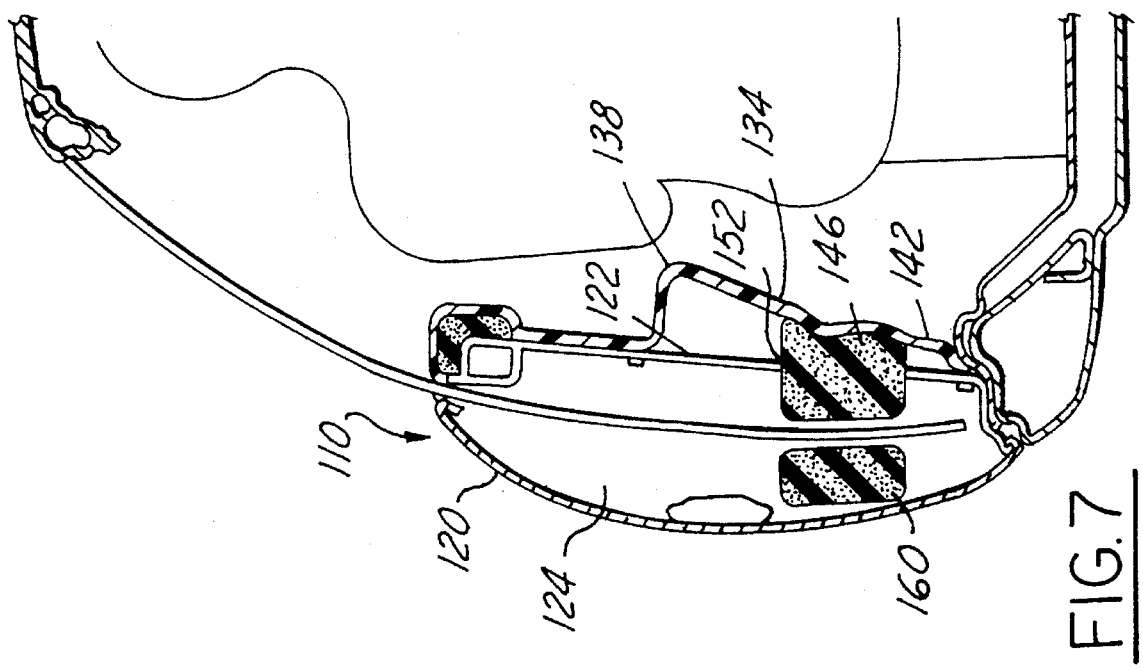
FIG. 7 is a side elevational view through a vehicle door showing the energy absorbing means and trim assembly according to a second embodiment of the present invention illustrated in operational relationship with an occupant and a vehicle partially shown.
Figure 9:
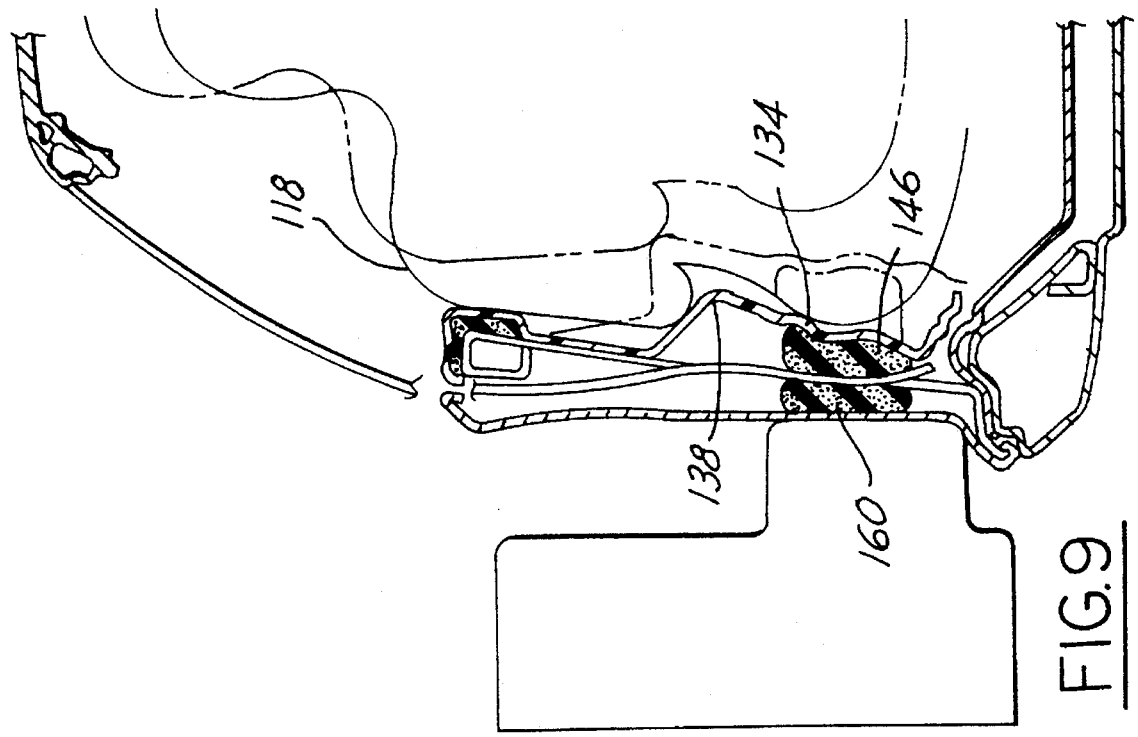
FIG. 9 is a side elevational view similar to FIGS. 7 and 8 but shown the energy absorbing means in a crushed state after contact with an occupant.
Figure 8:
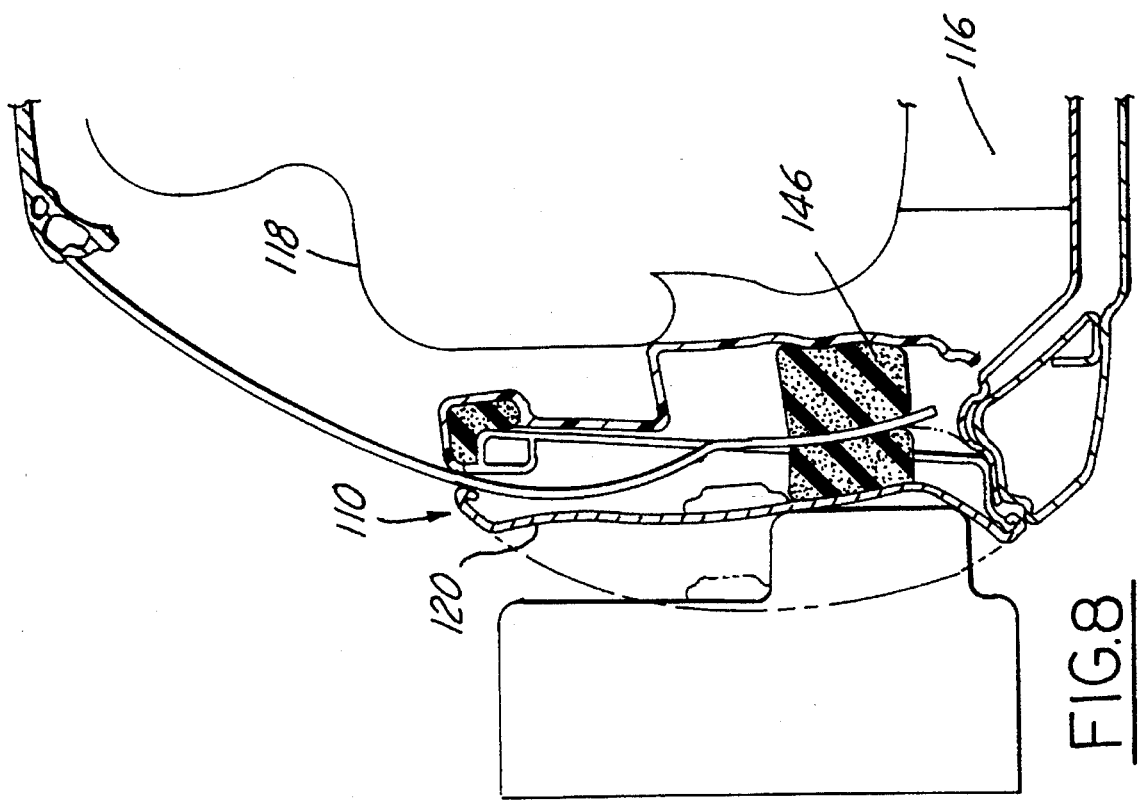
FIG. 8 is a side elevational view similar to FIG. 7 but shown with the energy absorbing means in an undeformed state deployed according to the present invention into the occupant seating area after a side impact type collision.

Referring now to FIGS. 7–9, a second embodiment of the energy absorbing vehicle door 110 is shown. Like parts of the vehicle door 10 have like reference numerals increased by one hundred (100). As seen in FIG. 7, door 110 has a trim panel 134 similar to door 10 with an arm rest 138 generally facing the occupant seating area 118 and is fixedly attached to the inner panel 122 proximate the arm rest 138 and releasably attached to the inner panel 122 at a lower portion 142, as described above. The energy absorbing vehicle door 110 further has an energy absorbing pusher block 160 in the space 124 between the outer panel 120 and the inner panel 122, which preferably is fixedly secured to an inner surface of the outer panel 120. Attachment may be by an adhesive, a mechanical fastener such as a retaining clips or a combination thereof. Energy absorbing means comprising at least one boster block 146 is fixedly secured as above to an inner surface of the trim panel 134 through the aperture 152 in the inner door panel 122 and arranged in lateral juxtaposition with the pusher block 160.

As seen in FIG. 8, imposition of a predetermined load generally normal to the vehicle door 110 deflects the outer panel 120 and moves the pusher block 160 into contact with the bolster block 146, albeit with a portion of window 128 therebetween, so as to deploy the trim panel 134 toward the occupant seating area 116. The bolster block 146 is thus presented in a substantially undeformed condition with the advantageous results previously discussed. As described above, the occupant 118 contacts the deployed trim panel 134 while moving toward the door 110 and is cushioned by the bolster block 146 and the pusher block 160, both of which are compressed during the event (FIG. 9). Additionally, arm rest 138 collapses as before from contact with occupant 118, thus providing further energy absorption.

Those skilled in the art will realize that the energy absorbing vehicle doors 10 and 110 may eliminate the moveable window and have a fixed window (not shown) secured in a recess which does not move into space 24 between the outer panel 20 and the inner panel 22.

The present invention has been described in an illustrative manner. It is to be understood that the terminology which has been used is intended to be in the nature of words of description rather than of limitation. It should be appreciated that the present invention has the same working principles applied to doors and body side panels of automotive vehicles. Although the preferred embodiments of the present invention have been disclosed, various changes and modifications may be made without departing from the scope of the invention as set forth in the appended claims.

We claim:

1. An energy absorbing vehicle door, comprising:

an inner panel;

an outer panel joined to said inner panel;

a trim panel having energy absorbing means attached thereto, said trim panel releasably mounted on said inner panel for deployment into a vehicle occupant compartment during a side collision type impact of said vehicle door so as to present the energy absorbing means in a substantially undeformed state to an occupant seating area in the occupant compartment.

2. An energy absorbing vehicle door as set forth in claim 1 wherein said energy absorbing means comprises a plurality of energy absorbing bolsters.

3. An energy absorbing vehicle door as set forth in claim 2 wherein said energy absorbing bolsters are foam material blocks.

4. An energy absorbing vehicle door as set forth in claim 3 including means for securing said foam material blocks to said trim panel.

5. An energy absorbing vehicle door as set forth in claim 4 wherein said securing means comprises an adhesive.

6. An energy absorbing vehicle door as set forth in claim 1 wherein said energy absorbing means comprises a plurality of energy absorbing bolsters with at least one energy absorbing bolster disposed between said inner panel and said outer panel and at least one energy absorbing bolster arranged in juxtaposition therewith between said inner panel and said door trim panel.

7. An energy absorbing vehicle door as set forth in claim 1 wherein said trim panel has an arm rest portion generally facing the occupant compartment, and wherein said trim panel is fixedly secured to said inner panel at said arm rest portion so that a lower portion of said trim panel pivots about said arm rest toward said occupant compartment during a side impact type collision of said vehicle door.

8. An energy absorbing vehicle door as set forth in claim 1 wherein said trim panel releasably attaches to said inner panel with at least one clip and screw arrangement.

9. An energy absorbing vehicle door as set forth in claim 1 including an intrusion beam secured to said vehicle door.

10. In an automotive vehicle occupant compartment having an occupant seating area therein and bounded on one side by an energy absorbing vehicle door, the door comprising:

an outer panel;

an inner panel laterally joined to the outer panel;

a trim panel releasably attached to an occupant compartment facing side of the inner panel and defining a space between the outer panel and the trim panel with the inner panel therein; and energy absorbing means mounted in the space so that when an externally originating load is applied generally normal to the door the trim panel deploys into the occupant compartment presenting the energy absorbing means in a substantially undeformed state to the occupant seating area.

11. An energy absorbing vehicle door as set forth in claim 10 wherein the energy absorbing means comprises a plurality of energy absorbing bolsters with at least one energy absorbing bolster disposed between the inner panel and the outer panel, and at least one energy absorbing bolster disposed in juxtaposition therewith between the inner panel and the door trim panel.

12. An energy absorbing vehicle door as set forth in claim 11 wherein the trim panel is fixedly secured to the inner panel along a generally longitudinal axis at an arm rest portion of the trim panel so that upon imposition of a load generally normal to the door the trim panel moves generally pivotally upwardly into the occupant seating area from a first position releasably attached at a lower portion of the trim panel to a second position detached from the lower portion of the trim panel.

13. An energy absorbing vehicle door as set forth in claim 12 wherein the plurality of energy absorbing bolsters comprise foam material blocks and are secured to the outer panel and to the trim panel with an adhesive.

14. An energy absorbing vehicle door as set forth in claim 13 wherein the arm rest portion is collapsible upon imposition of a load thereagainst originating generally from the occupant seating area.

15. An energy absorbing vehicle door as set forth in claim 14 wherein the trim panel releasably attaches to the lower portion of the inner panel with at least one clip and screw arrangement.

16. In an automotive vehicle occupant compartment bounded on one side by a vehicle door and having an occupant seating area therein, an improved energy absorbing vehicle door comprising:

an outer door panel having at least one pusher block fixedly secured to an inner surface thereof;

an inner door panel joined to the outer panel and spaced laterally therefrom toward the occupant compartment and having at least one aperture therethrough proximate the occupant seating area;

a trim panel having an arm rest facing the occupant seating area, the trim panel fixedly attached to the inner panel proximate the arm rest and releasably attached to the inner door panel at a lower portion thereof; and energy absorbing means comprising at least one bolster block fixedly secured to an inner surface of the trim panel through the aperture in the inner door panel and arranged in juxtaposition with the at least one pusher block so that imposition of a predetermined load generally normal to the vehicle door deflects the outer panel and moves the at least one pusher block into contact with the at least one bolster block so as to deploy the trim panel toward the occupant seating area thus presenting substantially undeformed energy absorbing means thereto.

17. An energy absorbing vehicle door as set forth in claim 16 wherein the at least one bolster block and the at least one pusher block comprise foam material blocks and are secured to the outer panel and to the trim panel with an adhesive.

18. An energy absorbing vehicle door as set forth in claim 17 wherein the arm rest is collapsible upon imposition of a load thereagainst originating generally from the occupant seating area.

19. An energy absorbing vehicle door as set forth in claim 18 wherein the trim panel releasably attaches to the lower portion of the inner panel with at least one clip and screw arrangement.

20. An energy absorbing vehicle door as set forth in claim 19 wherein the at least one pusher block attaches to the outer panel with a mechanical type fastener.

\* \* \* \* \*